United States Patent [19]

McKee

[11] 4,090,405
[45] May 23, 1978

[54] POLISHED ROD LOAD TRANSDUCER

[75] Inventor: Fount E. McKee, Houston, Tex.

[73] Assignee: Delta-X Corporation, Houston, Tex.

[21] Appl. No.: 787,675

[22] Filed: Apr. 14, 1977

[51] Int. Cl.$^2$ .............................................. G01L 1/22
[52] U.S. Cl. ................................................ 73/151
[58] Field of Search ................. 73/151, 141 A, 88.5 R

[56] References Cited

U.S. PATENT DOCUMENTS

| 3,618,376 | 11/1971 | Shull et al. | 73/141 A X |
| 3,914,992 | 10/1975 | Babcock | 73/141 A X |
| 3,965,736 | 6/1976 | Welton et al. | 73/151 |
| 3,985,025 | 10/1976 | Ormond | 73/141 A |

Primary Examiner—Jerry W. Myracle
Attorney, Agent, or Firm—Fulbright & Jaworski

[57] ABSTRACT

A polished rod load transducer for connection to the polished rod for measuring the load in a sucker rod well pumping system in which the transducer body has at least three symmetrical sections pivotally connected together with a clamping means connected to the body for clamping the body about a polished rod. A strain gauge is mounted on each of the sections and the strain gauges are equally spaced about the body when the body is clamped on a polished rod. An electrical circuit is connected to all of the strain gauges for measuring the total output from all of the strain gauges whereby an accurate measurement of the axial strain in the polished rod can be obtained in spite of the fact that the polished rod may be subjected to bending or be under or oversized. Preferably, the strain gauges are connected in series in one leg of a Wheatstone bridge circuit.

3 Claims, 5 Drawing Figures

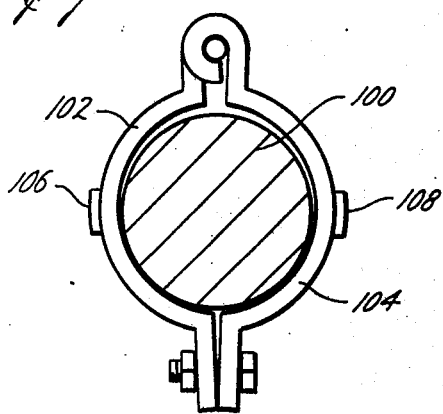
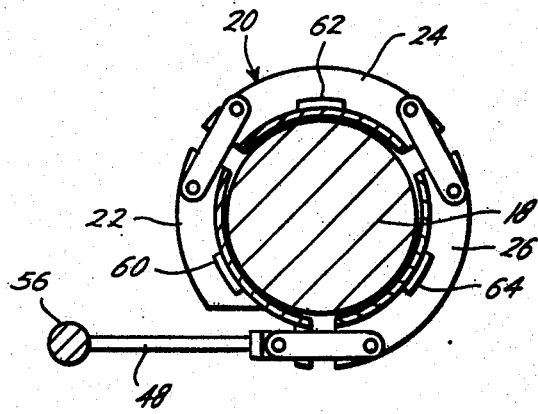
PRIOR ART
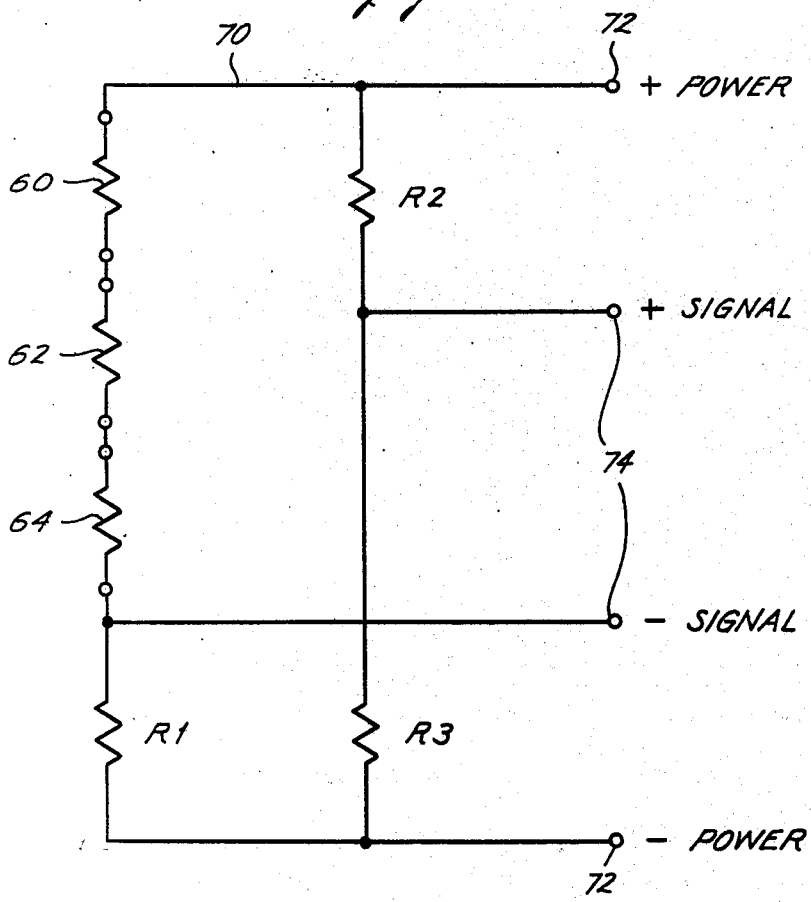

POLISHED ROD LOAD TRANSDUCER

BACKGROUND OF THE INVENTION

In pumping oil from underground reservoirs, it is conventional to utilize a motor driven walking beam to vertically reciprocate a string of sucker rods to actuate a downhole pump. The upper end of the string of sucker rods includes a polished rod which reciprocates through a stuffing box. It is desirable to measure the load in the string of sucker rods for monitoring the operation of the pump and the axial loads in the sucker rods.

One apparatus for measuring the loads in the string of sucker rods is the use of a strain gauge transducer, such as shown in U.S. Pat. No. 3,965,736, which utilizes a split cylinder clamped around the polished rod which has strain gauges bonded thereto which measures the strain of the polished rod. However, it is very rare that the polished rod will have only an axial load. Usually there is a slight bending of the polished rod during its reciprocation up and down. Bending of the polished rod will create positive and negative strains on opposite sides of the polished rod. A split cylinder type of transducer will generally measure both the bending strains and the axial strain in the polished rod and will not give an accurate measurement of only the axial strain in the polished rod, which is the property desired to be measured. Furthermore, it is also very rare that the polished rod size is exact. A split cylinder type of transducer only contacts an undersized or oversized polished rod at a minimum contact area and is subject to slippage under heavy rod loads which causes further errors in measuring the load in the rod string.

The present invention provides an improved polished rod load transducer which overcomes the problems of the prior art by providing a configuration which cancels out the effects of bending on the polished rod and therefore measures only the axial or load strain in the polished rod, and which provides a greater area of contact with the polished rod for reducing the possibility of transducer slippage.

SUMMARY

The present invention is directed to a polished rod load transducer having three or more symmetrical sections pivotally connected together for clamping about the polished rod. A strain gauge is mounted on each section for measuring the strain in each section. An electrical circuit is connected to the strain gauges for measuring the sum of the outputs of all the strain gauges. Since the sections are located symmetrically and equally about the polished rod and the output of the strain gauges are summed, any bending of the polished rod does not interfere with the measurement of the axial load on the polished rod. That is, during bending of the polished rod, some sections of the transducer will be loaded more and some will be loaded less due to bending strain, but the increased bending strain measured by one or more of the sections is offset by a decreased bending strain in other sections whereby the sum of the output is a measurement only of the axial strain in the polished rod.

A further feature of the present invention is the provision of a polished rod load transducer in which the transducer body has at least three symmetrical sections thereby providing an increased transducer to polished rod contact in the event that the polished rod is under or oversized which acts to prevent slippage under high rod loads for insuring accurate measurement of the loads.

Yet a still further object of the present invention is the provision of a polished rod load transducer for releasable connection to a polished rod in which the body has at least three arcuate symmetrical sections pivotally connected together with clamping means for releasably clamping the body about the polished rod with the three sections equally spaced around the circumference of the polished rod. A strain gauge is mounted on the middle of each section and all of the strain gauges are connected in series in an electrical measuring circuit to provide the sum of only the axial strains in each of the sections. Preferably, the electrical circuit is a Wheatstone bridge circuit in which all of the strain gauges are connected in series in one leg of the bridge.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 3 is an enlarged cross-sectional view taken along the line 3—3 of FIG. 1, FIG. 4 is a cross-sectional view of the prior art type of transducer, and FIG. 5 is an electrical schematic diagram of the electrical circuit connected to the present transducer for measuring the strain.

DESCRIPTION OF THE PREFERRED EMBODIMENT

Figure 1:
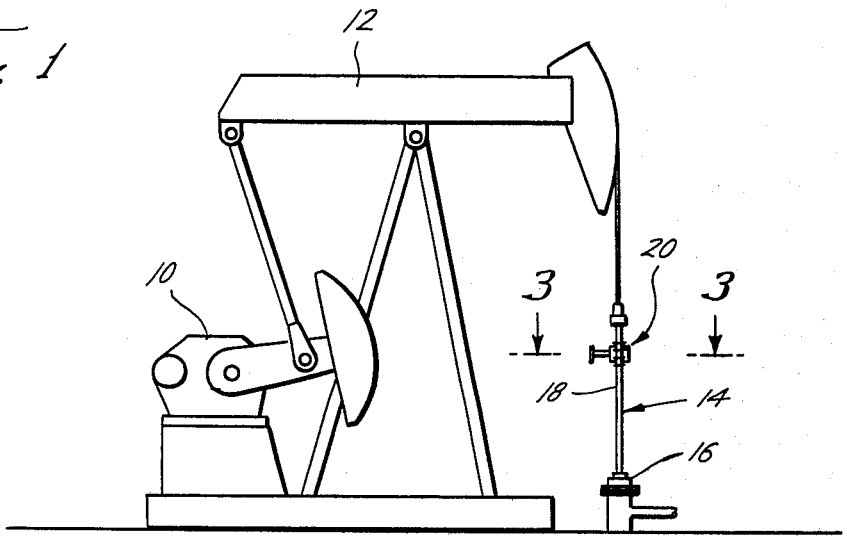
FIG. 1 is an elevational view of a conventional well pumping unit utilizing the present invention.

Referring now to the drawings, and particularly to FIG. 1, a prime mover such as a motor 10 reciprocates one end of a walking beam 12. The second end of the beam 12 is connected to and vertically reciprocates a sucker rod string generally indicated by the reference numeral 14 through a stuffing box 16 at the wellhead for actuating a downhole pump (not shown) for pumping fluid. The upper end of the string 14 includes a polished rod 18 which moves through the stuffing box 16 and carries the weight of the downhole sections of sucker (not shown). The above-named description of a well pumping unit is conventional.

Figure 2:
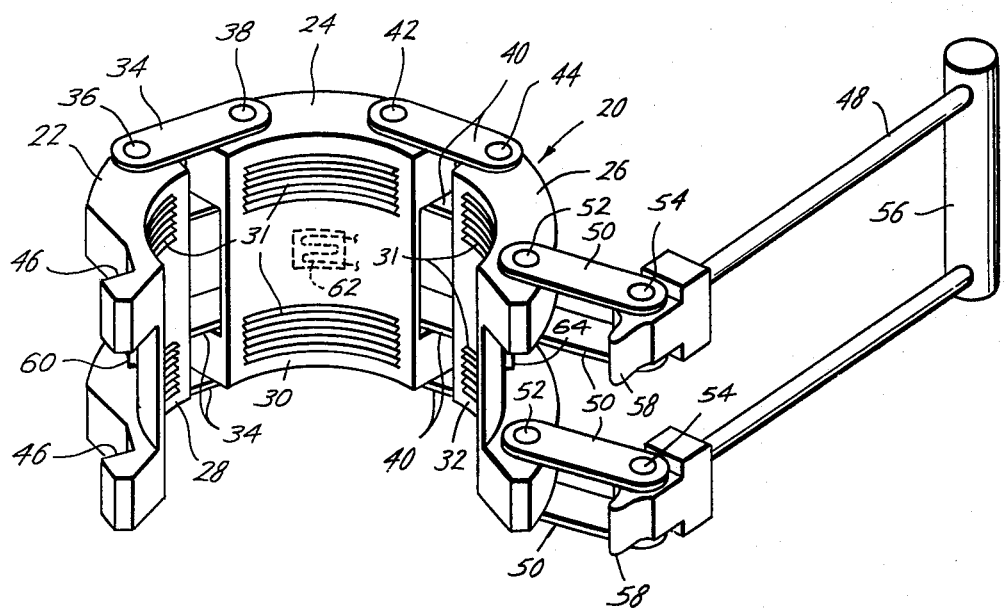
FIG. 2 is an enlarged perspective view of the transducer of the present invention shown in the open position.

The present invention is directed to providing a polished rod load transducer, generally indicated by the reference numeral 20. Referring to FIGS. 2 and 3, the transducer 20 includes a body having three or more symmetrical sections 22, 24, and 26. Each of the sections 22, 24 and 26 includes an arcuate interior face 28, 30 and 32, respectively, for clamping to the exterior of the polished rod 18 whereby any strain in the polished rod 18 is also applied to the body sections 22, 24 and 26. Preferably, each of the faces 28, 30 and 32 includes a serrated surface 31 adjacent the top and bottom of each face 28, 30 and 32 for securely gripping the exterior of the polished rod 18. The symmetrical sections 22, 24 and 26 are pivotally connected together by any suitable means. As illustrated, sections 22 and 24 are pivotally connected together by one or more hinges 34, one end of which is connected to section 22 by pins 36 and the second end of which is connected to section 24 by pins 38. Similarly, sections 24 and 26 are pivotally connected together by one or more hinges 40, one end of which is connected to section 24 by pins 42 and the other end of which is connected to section 26 by pins 44.

Any suitable clamping means may be utilized for connecting the free ends of sections 22 and 26 together about a polished rod 18. For example, section 22 may include clamping shoulders 46, and a clamping lever 48 may be pivotally connected to section 26 by one or more hinges 50, one end of which is connected to section 26 by pins 52 and the other end of which is connected to the clamping lever 48 by pins 54. The lever 48 includes an actuating handle 56 and engaging lugs 58. The transducer may be releasably connected to a polished rod 18 by encircling the exterior of the polished rod 18 with transducer 20, closing the free ends of sections 22 and 26, inserting the engaging lugs 58 into the locking shoulders 46 and actuating the lever 48 past dead center to allow the arcuate portions 28, 30 and 32 to securely grip the polished rod 18 as best seen in FIG. 3.

A strain gauge is mounted, preferably on the outside, on each of the sections 22, 24 and 26 for measuring the strain in each of the sections which is an indication of the strain in the polished rod 18. Therefore, strain gauges 60, 62 and 64 are mounted, preferably in the middle and between a pair of serrated surfaces 31, of each of the sections 22, 24 and 26, respectively. Referring now to FIG. 5, an electrical circuit generally indicated by the reference numeral 70 is illustrated for connection to the strain gauges 60, 62 and 63 for measuring the strain in the polished rod 18. The function of electrical circuit 70 is to measure the total output from all of the strain gauges 60, 62 and 64. Preferably, the electrical circuit 70 is a conventional Wheatstone bridge circuit with the strain gauges 60, 62 and 64 connected in series in one leg of the bridge which includes in the other legs resistors R1, R2 and R3. Power is supplied to the circuit 70 at power inputs 72 and a signal output is obtained at output 74.

Referring now to FIG. 4, a prior art type of transducer is shown positioned about a polished rod 100 in which the transducer includes a first 102 and a second 104 split cylinder with strain gauges 106 and 108 bonded thereto respectively. As has previously been mentioned, it is very rare that the polished rod will have only an axial load. Usually there will be a slight bending of the polished rod during its reciprocal travel. If the direction of bending were solely in a vertical plane through both of the strain gauges 106 and 108, then the prior art transducer of FIG. 4 would give an accurate measurement of the axial load. That is, if the bending of the polished rod 100 were solely in such a vertical plane, there would be an increase strain at one of the strain gauges and a decrease strain at one of the strain gauges due to the strain of bending. And if the bending was in such a plane the bending strains would compensate and cancel each other out. However, if the polished rod 108 bent in any direction other than the vertical plane through both strain gauges 106 and 108, the strain induced in the polished rod 108 would create an erroneous readout from the transducer of FIG. 4.

On the other hand, referring to FIG. 3 of the present transducer 20, the use of three or more sections 22, 24 and 26 and three or more equally spaced strain gauges 60, 62 and 64 will insure that regardless of the direction of bending of the polished rod 18 the strains caused by the bending will compensate each other and the electrical circuit in FIG. 5 will measure only the axial strain in the polished rod 18. That is, bending of the polished rod 18 will load some of the sections 22, 24 and 26 and their corresponding strain gauges 60, 62 and 64 more, but some of the sections and corresponding strain gauges will be loaded less and the positive bending strains will be equal to and compensate for the negative strains due to bending and therefore the sum of the outputs of the strain gauges 60, 62 and 64 will be a measurement solely of the axial strain on the polished rod which is what is desired to be measured.

Furthermore, and again referring to the prior art transducer of FIG. 4, it is to be noted that it is very rare that the polished rod size is exact. Usually the polished rod is slightly smaller than its designated size. If this occurs, then the split cylinder sections 102 and 104 would only contact the polished rod 108 at one point on each of the split sections 102 and 104. Therefore, the difference in the size of the diameter of the transducer interior and the exterior of the polished rod diameter causes the transducer to rod 108 contact to be small and will allow the transducer to slip under heavy axial loads applied to the rod 108 and give inaccurate readings. On the other hand, the transducer 20 of the present invention, as best seen in FIG. 3, will insure that there is a transducer to rod 18 contact in at least three places even if the rod 18 is undersized thereby providing a greater transducer to polished rod 18 contact for preventing slippage under high axial rod 18 load. The present transducer 20, shown in FIGS. 2 and 3, will also have greater transducer to polished rod contact than the transducer of the prior art transducer of FIG. 4 in the event that the polished rod is oversized.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A polished rod load transducer for connection to the polished rod for measuring the load in a sucker rod well pumping system comprising,
    a body having at least three symmetrical sections pivotally connected together,
    releasable clamping means having a pivoting lever connected to said body for clamping the body about a polished rod,
    a strain gauge mounted on each of the sections for measuring the strain of each section when the body is clamped on a polished rod,
    an electrical circuit connected to all of said strain gauges for measuring the total output from all of the strain gauges.

2. A polished rod load transducer for releasable connection to the polished rod for measuring the load in a sucker rod well pumping system comprising, equally spaced about the body when the body is clamped on the polished rod for measuring the strain in the polished rod,
    an electrical circuit connected to all of the strain gauges for measuring the total output of all of the strain gauges.

a body having at least three arcuate symmetrical sections pivotally connected together, each section including interior horizontally extending serrated surfaces for gripping a polished rod, releasable clamping means connected to said body for releasably clamping the body about a polished rod with the sections equally spaced about the polished rod, a strain gauge mounted on the middle of each of the sections and positioned between the serrated surfaces thereby being equally spaced about the body when the body is clamped on the polished rod for measuring the strain in the polished rod, an electrical circuit connected to all of the strain gauges for measuring the total output of all of the strain gauges.

3. The apparatus of claim 2 wherein the clamping means includes, a lever pivotally connected to one of the sections, an engaging lug connected to the lever, and a locking shoulder on another of the sections for receiving said lug.

* * * * *

UNITED STATES PATENT OFFICE
CERTIFICATE OF CORRECTION

Patent No. 4,090,405      Dated May 23, 1978

Inventor(s) Fount E. McKee

It is certified that error appears in the above-identified patent and that said Letters Patent are hereby corrected as shown below:

Column 2, line 48, after "sucker" add -- rod --

Column 4, lines 62-68, delete "equally spaced about the body when the body is clamped on the polished rod for measuring the strain in the polished rod,
    an electrical circuit connected to all of the strain gauges for measuring the total output of all of the strain gauges."

Signed and Sealed this

Thirty-first Day of October 1978

[SEAL]

Attest:

RUTH C. MASON
Attesting Officer

DONALD W. BANNER
Commissioner of Patents and Trademarks